(12) United States Patent
Wolf et al.

(10) Patent No.: US 7,665,941 B2
(45) Date of Patent: Feb. 23, 2010

(54) METHOD AND STRUCTURE FOR AN ANCHOR ROD CAP

(75) Inventors: Theodore L. Wolf, Concord, OH (US); Alan R. Wolf, Dublin, OH (US)

(73) Assignee: The Dyson Corporation, Painesville, OH (US)

( * ) Notice: Subject to any disclaimer, the term of this patent is extended or adjusted under 35 U.S.C. 154(b) by 449 days.

(21) Appl. No.: 11/460,320

(22) Filed: Jul. 27, 2006
(Under 37 CFR 1.47)

(65) Prior Publication Data

US 2007/0022703 A1  Feb. 1, 2007

Related U.S. Application Data

(60) Provisional application No. 60/703,043, filed on Jul. 27, 2005.

(51) Int. Cl.
*F16B 37/14* (2006.01)
(52) U.S. Cl. ...................... 411/431; 411/429
(58) Field of Classification Search .............. 411/429, 411/430, 533, 375, 428, 910, 372.6, 377, 411/372.5, 431
See application file for complete search history.

(56) References Cited

U.S. PATENT DOCUMENTS

| | | | |
|---|---|---|---|
| 972,140 A * | 10/1910 | Adam | 411/429 |
| 1,254,514 A * | 1/1918 | Lehmann | 411/429 |
| 3,471,158 A | 10/1969 | Solins | |
| 3,521,413 A * | 7/1970 | Scott et al. | 52/98 |
| 4,400,123 A * | 8/1983 | Dunegan | 411/373 |
| 4,557,654 A | 12/1985 | Masuda et al. | |
| 4,826,380 A * | 5/1989 | Henry | 411/377 |
| 4,907,929 A | 3/1990 | Johnston, Jr. | |
| 5,590,992 A | 1/1997 | Russell | |
| 5,752,795 A * | 5/1998 | D'Adamo | 411/429 |
| 6,135,691 A * | 10/2000 | Nadarajah et al. | 411/431 |
| 6,808,350 B1 | 10/2004 | Tooman et al. | |

\* cited by examiner

*Primary Examiner*—Gary Estremsky
(74) *Attorney, Agent, or Firm*—Patrick J. Daugherty; Driggs, Hogg, Daugherty & Del Zoppo Co., LPA

(57) ABSTRACT

An anchor rod cap and method for protecting an anchor rod bolt/nut/lower flange assembly are provided. An anchor rod is provided having upper and lower tubular elements connected by a shoulder. The upper element is disposed about the anchor rod threads and has an interior surface defined on a radius smaller than an anchor rod thread outer radius. The lower tubular element has an interior radius larger than an anchor nut outer dimension and is configured to define an air gap between the lower tubular element inner surface and an anchor nut encompassed thereby. A lower tubular element bottom edge is configured to form a physical barrier interface with the anchor rod base flange. At least one of the upper tubular element interior surface and the lower tubular element bottom edge are configured to form a sealing interface with anchor rod thread outer surfaces or an upper flange surface.

19 Claims, 3 Drawing Sheets

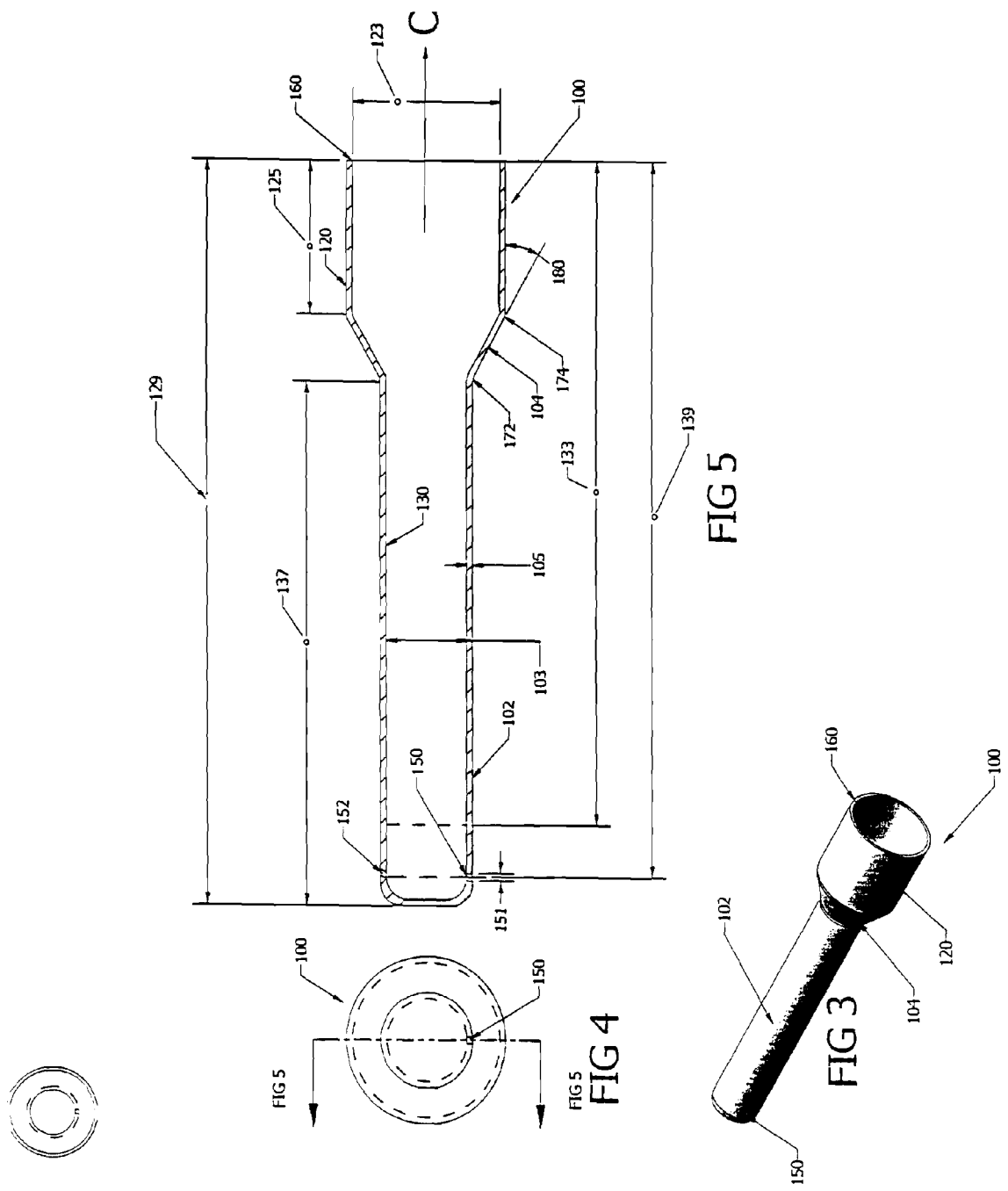

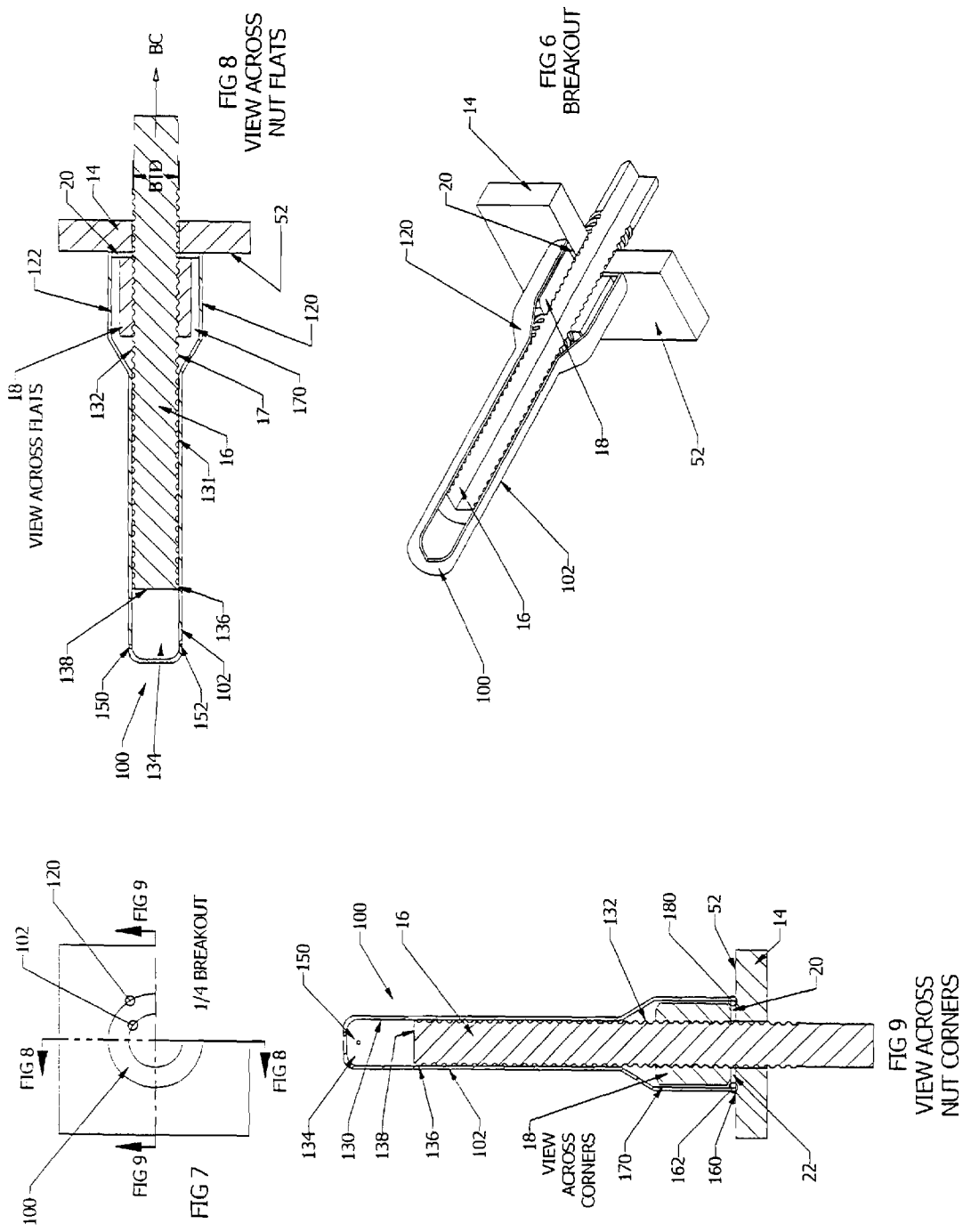

METHOD AND STRUCTURE FOR AN
ANCHOR ROD CAP

REFERENCE TO RELATED APPLICATIONS

This application claims the benefits of a provisional patent application previously filed in the Patent Office by common inventors Theodore L. Wolf and Alan R. Wolf on Jul. 27, 2005, Ser. No. 60/703,043, and entitled METHOD AND STRUCTURE FOR AN ANCHOR ROD CAP

BACKGROUND OF THE INVENTION

The invention relates to the protection of structural fasteners and assemblies from environmental exposures. The invention relates in general to "wind generator" applications, although it will be readily apparent that the present invention may be utilized in many other types of structures and applications, and the invention is by no means limited to wind generator applications. Wind generators are used in the generation of electricity through the rotation of turbines and conventionally feature a plurality of propellers or blades arrayed high enough above the ground to be responsively compelled into rotation by naturally occurring wind.

In one common style of wind generator, a tower structure is provided (conventionally about 200 feet high or higher), at the top of which is an array of large propellers or blades (conventionally about 90 feet or longer) which are rotated by the wind forces, thereby generating electricity. Referring now to FIGS. 1 and 2, views of a typical prior art wind tower installation are provided. The bottom end of a wind generator tower base 10 is attached to a base foundation 20 firmly installed into the earth, typically 30 feet or more deep, through a plurality of anchor bolts 16. A door 12 gives access to the interior of the tower base. An annular flange 14 is formed on the bottom end of tower base 10. The top ends of anchor bolts 16 extend at least 10 inches above the top surface of flange 14 and each has a nut 18 threaded thereon. A concrete walk 19 extends around the perimeter of tower base 10. The base foundation 20 is covered by dirt 21.

FIG. 2 is a sectional side elevation view of base foundation 20. It is formed on site in a hole approximately 30 feet deep and about 10-15 feet in diameter. A metal embedment ring 23 is placed in the base foundation hole spaced a predetermined distance above the bottom of the hole. Approximately 250 anchor bolts 16 have their bottom ends captured in apertures in the embedment ring and have a nut threaded onto their bottom end. The anchor bolts are oriented in two concentric circular patterns. Each of the anchor bolts 16 has a tubular conduit 40 slid over them to protect them from concrete that is later poured between cylinder inner metal form 25 and cylinder outer metal form 27. Horizontally spaced rebar hoops 29 maintain the anchor bolts in their proper alignment. Spacer rods 31 are located at various positions to keep the respective inner and outer metal forms 25 and 27 in their proper positions. Outer metal form 27 is longer than inner metal form 25 so that when concrete 33 is poured between the respective forms, it will travel downwardly and centrally to form a concrete bottom wall 35. Dirt is filled into the area within the center of metal form 25. A metal template ring 37 has an outer and inner circular pattern of apertures for receiving the top ends of the respective anchor bolts 16. The top surface of metal template ring 37 forms an annular trough that is later filled with grout. When the grout has properly set, the bottom end of tower base 10 is erected on the top surface of metal template ring 37 with the respective top ends of the anchor bolts 14 passing through the respective apertures in the inner flange (not shown) and outer flange 14 in the manner illustrated in FIG. 1.

In a typical prior art installation, the nuts 18 are screwed on the top end of anchor bolts 16, following which a second nut is then threaded onto "the top end" of the respective anchor bolts, and hydraulic jacks are attached thereto so that the anchor bolts can be stressed to approximately 70 to 80 thousand pounds of stress. At this time, the lower nuts 18 are cinched down and the hydraulic jacks and their associated nuts are removed.

It is common for wind generators and their associated tower base assemblies to provide for an expected service lifespan of between 20 and 30 years. However, of particular concern over the anticipated lifespan of the tower base assembly is the effect of corrosion of structural materials due to environmental exposure. Anchor rod bolts 16 are typically fabricated from high-strength metal "rebar" source material, and anchor rod nuts 18 are also typically fabricated from high-strength metallic source materials. It is well known that many high-strength metal source materials experience oxidation and/or other corrosion degradations responsive to exposure to moisture and oxidizing air and other gases. Accordingly, anchor rod and nut surfaces exposed to moisture will experience corrosion degradation over time, which may be severe enough to reduce the serviceable lifespan of either or both of the anchor rod bolt and nut to a period significantly less than the serviceable life of a wind tower generator.

Specifically, the top ends of the anchor bolt assemblies are exposed to environmental corrosion-causing or enabling elements, such as sun, wind, rain, snow and moisture. The anchor rod 16 which surfaces below the base flange 14 must also be protected from oxygen, moisture, environmental exposure and other agents that may enter the air space between the anchor rod 16 and the tubular conduit 40 and cause degradation of anchor rod surfaces protective coverings. Without adequate waterproofing measures, water and condensing moisture may enter along the bottom surfaces of the wind tower base flange and seep down from the bottom surface areas of the wind tower foundation and into the lower anchor rod 16 and base foundation tubular conduit 40 assembly. Air may also be admitted, resulting in oxygen or air-entrained moisture attack on the anchor rod 16 surfaces below the base flange 14. Such corrosion degradation may weaken an anchor rod 16 and thereby significantly shorten the effective life of a wind generator tower base. Therefore, it is important to prevent the introduction of corrosive agents, such as air, moisture and water onto the exposed anchor rod 16, nut 18, washer 20 and upper flange surface 14 structures above the flange 14. It is also important to prevent the introduction of corrosive agents onto surface areas of the anchor rod 16 throughout its entire structural length below the wind tower base flange 14.

One solution for this problem is to cover the exposed anchor bolts 16 and nuts 18 with a film of grease to keep them protected from attack by oxygen or moisture in the air. However, the grease-film layer must itself be protected in order to keep the layer intact during the service life of the anchor bolt and nut assembly. Environmental erosion factors including wind, sun, rain and snow, and/or grazing livestock, wild animals or human tampering may remove all or part of the protective grease-film layer, thereby exposing the metal surfaces and resulting in oxidation corrosion damage to the assembly. Also, an exposed anchor nut 18 and bolt 16 assembly may invite vandalism and tampering with the assembly.

Accordingly, what is needed is an additional physical protective barrier structure that will protect the water and gasresistant film layers commonly deposited on anchor nut 18 and rod 16 assemblies, thereby preventing corrosion over the serviceable life of the anchor rod and base flange assembly structures.

SUMMARY OF THE INVENTION

Aspects of the present invention address these matters and others.

In accordance with one aspect of the present invention, an anchor rod cap and method for protecting an anchor rod bolt/nut/lower flange assembly are provided. An anchor rod is provided having upper and lower tubular elements connected by a shoulder. The upper element is disposed about the anchor rod threads, and has an interior surface defined on a radius smaller than an anchor rod thread outer radius. The lower tubular element has an interior radius larger than an anchor nut outer dimension, and is thus thereby configured to define an air gap between the lower tubular element inner surface and an anchor nut encompassed thereby. A lower tubular element bottom edge is configured to form a physical barrier interface with the anchor rod base flange.

In one aspect, at least one of the upper tubular element interior cylindrical surface, the shoulder and the lower tubular element bottom edge are formed from a resilient material. In another aspect, the upper tubular element may further define a ventilation aperture.

In one aspect, the shoulder is generally conical, and may be defined on a shoulder angle of about 30 degrees from a central axis common to the upper and lower tubular elements.

In another aspect, at least one of the upper tubular element interior cylindrical surface and the lower tubular element bottom edge are configured to form a sealing interface with anchor rod thread outer surfaces or an upper flange surface. In one aspect, the lower tubular element interior radius may be smaller than an outside radius of an anchor rod washer; and in a further aspect, the lower tubular element interior surface may be configured to form a sealing interface with a washer outside edge surface.

In one aspect, an anchor rod assembly is provided, wherein an anchor nut is tightened about an anchor rod onto an anchor washer, the washer compelled by the anchor nut against an anchor flange. A protective film is disposed about outer surfaces of the anchor nut, anchor rod and anchor washer, wherein an anchor rod cap upper tubular element having an interior surface defined on a radius smaller than an anchor rod thread outer radius is disposed about and firmly engages the anchor rod threads. An anchor rod cap lower tubular element having an interior radius larger than an anchor nut outer dimension is disposed about the nut and defines an air gap between the lower tubular element inner surface and the anchor nut. And a lower tubular element bottom edge forms a physical barrier interface with the anchor rod base flange.

In one aspect, a method protects an anchor rod assembly by disposing a protective film on outer surfaces of an anchor bolt/anchor nut/anchor washer/anchor flange assembly and disposing an anchor rod cap circumferentially surrounding thereabout.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 3 is a side perspective view of an anchor rod cap according to the present invention.

FIG. 4 provides a bottom view of the anchor rod cap of FIG. 3.

FIG. 5 provides a side sectional view of the anchor rod cap of FIG. 3 taken along the line indicated in FIG. 4.

FIG. 6 provides a perspective and partial sectional illustration of an anchor nut and bolt rod assembly incorporating the anchor rod cap of FIG. 3.

FIG. 7 provides a bottom view of the anchor rod cap and nut and bolt assembly of FIG. 6.

FIG. 8 provides a side sectional view of the anchor rod cap and nut and bolt assembly of FIG. 6 taken along the line indicated in FIG. 7.

FIG. 9 provides a side sectional view of the anchor rod cap and nut and bolt assembly of FIG. 6 taken along the line indicated in FIG. 7.

DETAILED DESCRIPTION OF THE INVENTION

Figure 2:
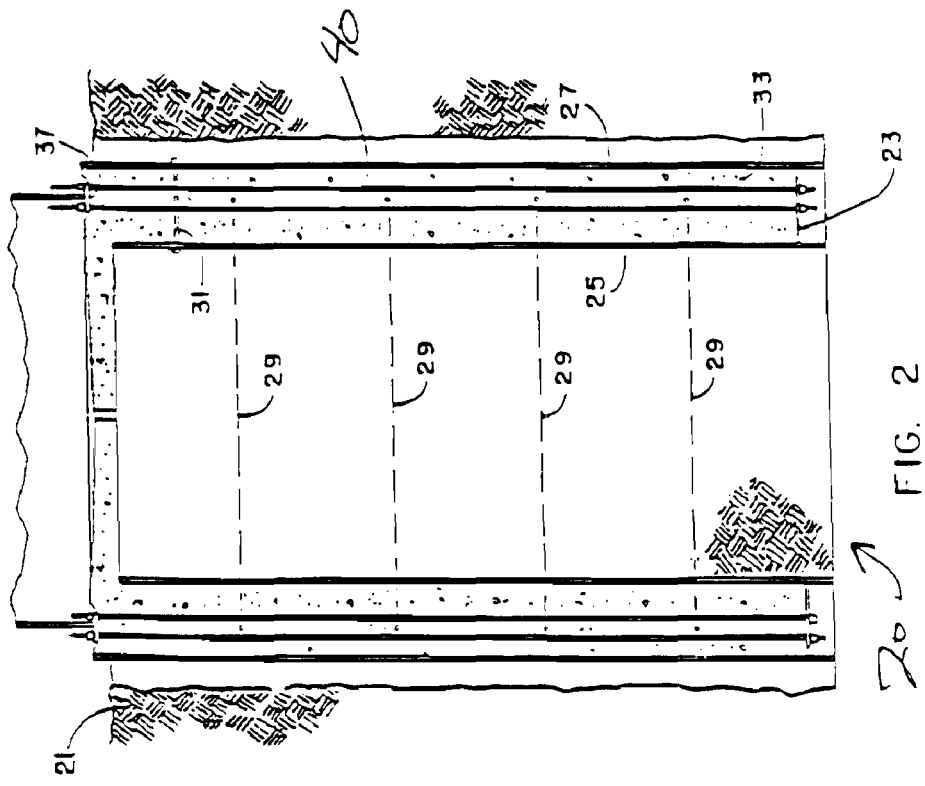
FIG. 2 is a cross section illustration of a prior art wind generator base foundation.
Figure 1:
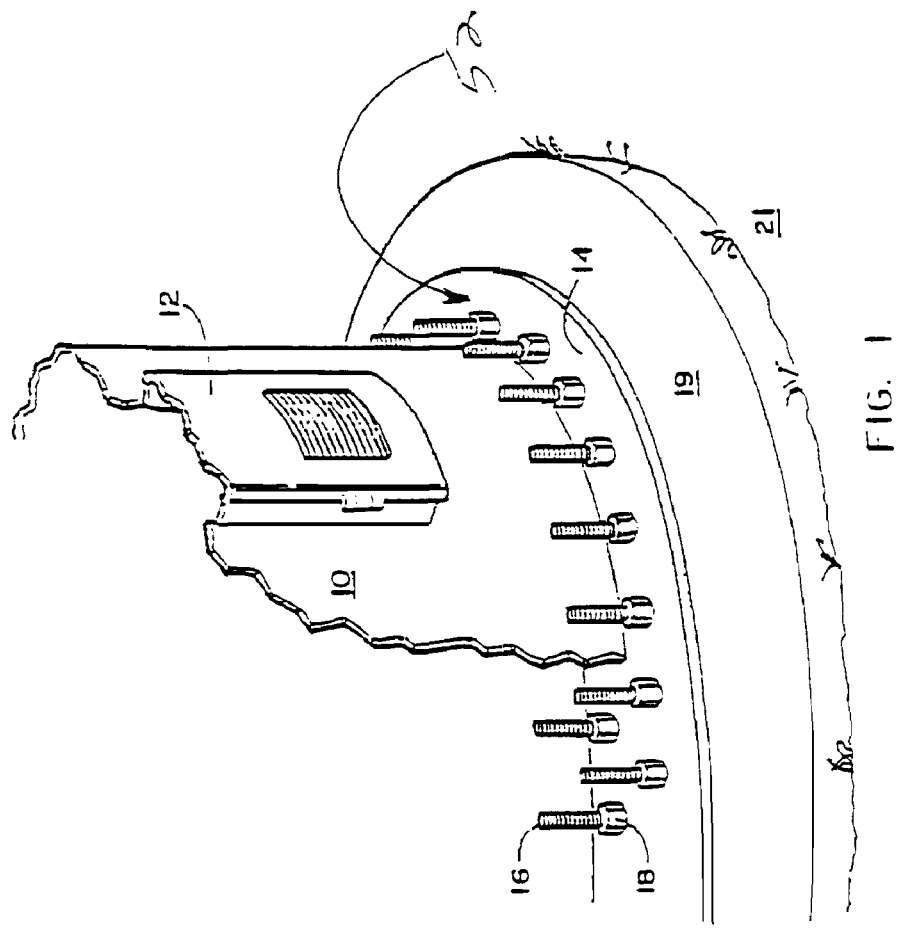
FIG. 1 is a partial front perspective view of the bottom of a prior art wind generator tower base assembly.

The present invention relates to an anchor rod cap for application to anchor nut and anchor rod bolt assemblies. An anchor rod cap embodiment 100 of the present invention is illustrated FIGS. 3-9. The anchor rod cap 100 has a first upper cylindrical tubular structure 102 configured for disposition about the exposed upper end of an anchor bolt 16 in a typical wind tower flange 14 and nut 18 assembly shown in FIGS. 1 and 2. A second bottom larger tubular structure 120 is connected to the first upper cylindrical tube 102 and is configured to encompass an anchor nut 18 and associated washer 20, and will be described with more particularity below.

The inner surface 130 of the first upper cylindrical tube 102 is defined by a first interior surface diameter 103 selected to correspond to an anchor bolt rod 16 thread outer diameter BTD. In the present embodiment 100 of the invention, the interior diameter 103 is selected to be less than the anchor bolt rod 16 outer thread diameter BTD. This enables a frictional-fit of the first upper cylindrical tube 102 about the anchor bolt. This frictional interaction firmly keeps the anchor cap 100 installed onto the anchor rod bolt 16 after application, and resists removal of the anchor cap 100 responsive to environmental exposure elements, such as wind and driving rain; it also resists removal through engagement by livestock, such as grazing sheep; and it also presents a firm resistance to human removal efforts, such as tampering and vandalism by unauthorized personnel.

In some embodiments of the present invention, the friction-fitting capacities are enhanced by forming the anchor cap 100 from a flexible and resilient "rubber-like" material, such as exemplary white flexible PVC or black flexible PVC embodiments described below. Resilient deformable materials may deform and thereby conform to the outer surfaces of the anchor rod bolt 16, thereby providing a tight physical barrier along the anchor rod bolt 16 outer surfaces resistant to the intrusion of moisture and atmospheric corrosive agents. It is also to be understood that other materials, such as PVC materials having other color appearances, or other rubber or plastic compounds, are appropriate for practicing the present invention, and the invention is not to be construed as limited to the embodiments described herein.

And, moreover, the combination of the deformed anchor cap 100 first upper tube 102 inner surface 130 with grease or other water-resistant compounds and/or lubricants may result in a contiguous thin layer of said grease or lubricants compressed between the two inner surfaces 130 and the anchor bolt rod 16 outer surfaces and thereby further physically excluding air and other corrosive gases from said interface.

In addition, as will be readily apparent, protective grease or lubricant layers will also aid in the application of a tight-fitting anchor cap first upper tube 102 by providing lubricating properties that will reduce the frictional resistance to application or removal of the first upper tube inner surface 130 as it is forcibly slid along the anchor rod bolt 16 outer surfaces 17. The use of lubricating protective films thus enables increasingly tight tolerances by decreasing the first upper tube inner surface 130 inner diameter 103 value relative to the outer anchor bolt thread diameter BTD, since the lubricating properties of the protective grease layer will help overcome frictional resistance to the application or removal of the first upper tube 102.

However, although lubricating films may reduce frictional resistance, they also help provide vapor sealing properties that may resist dislocation of the anchor cap 100 from an anchor rod bolt 16 and anchor nut 18 assembly by creating resistant vacuum pressures during removal or application. Specifically, application of the anchor cap 100 onto an anchor rod bolt 16 necessarily requires displacement of air within the first upper tube 102 and, correspondingly, removal of the anchor cap 100 from an anchor rod bolt 16 necessarily requires an influx of air back into the first upper tube 102. However, where the first upper tube 102 is configured to tightly engage the anchor rod bolt 16, the ingress and egress of ambient air within the first upper tube 102 may be precluded by airtight physical barriers created at the interface 131 of the anchor bolt thread outer surface 132 with the upper tube inner surface 130, wherein the interface 131 may create an airtight seal preventing the movement of air thereby. It is readily apparent that tight tolerances between the upper tube inner surface 130 and the anchor bolt thread outer surfaces 132 alone will provide these sealing characteristics and, in particular, where the first upper tube inner surface 130 is formed from deformable and flexible materials, these sealing properties may be present with or without the presence of lubricating and/or protective films on the anchor bolt 16 outer thread surfaces. However, it is also readily apparent that the presence of lubricating and/or protective films on the anchor bolt 16 outer thread surfaces may enhance these air-tight sealing properties.

Thus, ambient air trapped within the first upper tube 102 between the top surface of the anchor bolt 138, the bolt/inner surface interfaces 136, and the tube inner surface 130 in the first tube top region 134, if precluded from escaping about the sealing interfaces 131, will become progressively compressed during application of the first upper tube 102 onto an anchor bolt 16, and the compressed air will, therefore, progressively and physically resist insertion of the anchor bolt 16 into the first upper tube 102. In fact, unless sufficient quantities of air are able to move out of the first tube top region 134 about the anchor bolt 16, the air will reach a maximum allowable state of compression, and further progression of the anchor bolt 16 into the first upper tube 102 application will be prevented.

In a similar fashion, ambient air must progressively enter the first tube top region 134 during the removal of an anchor cap 100. If air is precluded from entering the top region 134 by the sealing interfaces 131, then any air already present within the top region 134 will become progressively subject to vacuum forces attempting to drop the air pressure within the top region 134 compressed during removal of the first upper tube 102 from an anchor bolt 16, and the resulting increasing vacuum forces of air will progressively and physically resist removal of the anchor bolt 16 from the first upper tube 102. Unless sufficient quantities of air are able to move into the first tube top region 134 about the anchor bolt 16, the air will reach a maximum allowable state of vacuum, and further removal of the anchor bolt 16 from the first upper tube 102 application will be prevented. In some examples of embodiments of the invention, the vacuum forces become so great that removal of the anchor cap is impossible without destruction of the anchor cap itself.

Accordingly, in order to reduce air pressure/vacuum resistance to application/removal of an anchor cap according to the present invention onto/from an anchor bolt, some embodiments provide at least one ventilation hole through the first upper tube wall for the responsive admission or ejection of atmospheric air during removal or application, respectively. In the present embodiment 100 of the invention, one ventilation hole 150 is located near the top of the first upper tube 102, and is thus oriented to either admit or express air as required from the top inner region 134. By locating the ventilation hole 150 beyond an anticipated total possible insertion length dimension 133 of the anchor bolt 16, both air admission and egress without interference by physical occlusion from interface with the anchor bolt outer thread surface 132 can be assured. In one embodiment of anchor cap 100, for an anticipated total insertion length dimension 133 of about 10.75 inches, the ventilation hole 150 is located a placement distance dimension 139 from the base edge 160 of about 11.5 inches.

Although not required to practice the invention, by providing for a ventilation hole placement distance dimension 139 value greater than the anticipated total insertion length dimension value 133, a tolerance distance equal to the difference between these two dimensions 133 and 139 is provided. This tolerance distance enables insertion of an anchor rod 16 beyond an anticipated maximum insertion point 133 without occluding the ventilation hole 150. It also allows for the presence of grease, lubricating or sealing materials, adhesives, or other materials and/or contaminants that may be pushed into the upper closed airspace 134 by the anchor rod top surface 138, and/or accumulating along the upper outside thread surface areas 136 responsive to sliding along the first upper tube inside surface 130 during application of the anchor cap 100. A tolerance distance provides that such materials will accumulate below the location of the ventilation hole 150 and, therefore, not occlude it.

In some applications, the quantity of grease, lubricating or sealing materials, adhesives, or other materials and/or contaminants pushed into the upper closed space 134 by the anchor rod top surface 138 responsive to application of the anchor cap 100 may entirely fill the upper closed space 134. For these applications, it is apparent that the ventilation hole(s) 150 will be occluded or filled with the accumulated material, thus providing another sealing means to prevent the introduction of moisture, water or undesired air and gases into the upper closed space 134 through the ventilation hole(s) 150. And in other applications, the quantity of accumulating lubricating, etc., materials may define a volume in excess of the volume of the upper closed space 134. Here the ventilation hole(s) 150 will expel those quantities of the compressed lubricating, etc., materials in excess of the upper closed space 134 volume, thus enabling installation of the anchor cap 100 that the compressed excess materials would otherwise physically prevent; and it is apparent that some expelled material will probably remain within the ventilation hole(s) 150, thus again providing a sealing means to prevent the introduction of moisture, water or undesired air and gases into the upper closed space 134 through the ventilation hole(s) 150.

The total number or precise opening diameter 151 of each ventilation hole 150 is not critical, and one skilled in the art may readily determine the number and size of ventilation holes most appropriate for a desired application. In the present anchor cap embodiment 100, one ventilation hole 150 is provided with an opening diameter 151 of about ⅛", and this arrangement has been proven to efficiently allow removal or application of the anchor cap 100 to or from a No. 11 rebar anchor bolt 16, while minimizing the amount of environmental moisture and/or atmospheric gases allowed to enter the upper inner region 134 after application of the anchor cap 100. The opening formed by the ventilation hole 150 is also oriented generally normal to the central axis C defined by the anchor cap 100. As the anchor cap 100 when applied to an anchor bolt 16 is oriented on an upward and vertical orientation, this horizontal ventilation hole 150 orientation minimizes the amount of environmental moisture that may enter the upper region 134 responsive to environmental factors, including rain, wind, and melting snow. It is anticipated that any small amounts of moisture entering the ventilation hole 150 over the anticipated service life of the anchor bolt/nut/plant assembly will not be significant with respect to the protective sealing and lubricating characteristics of a protective sealant applied to the anchor bolt 16. What is important is that not enough moisture will enter the ventilation hole 150 to degrade the protective sealants and provide a significant erosion hazard to the anchor bolt 16. In another aspect of the invention, the sealing interfaces 131 act to prevent the downward motion of thus introduced moisture onto the nut 18/bolt 16/washer 20/flange 14 assembly.

An alternative ventilation hole 152 may also be utilized with the present invention, having a downward orientation in order to further prevent the introduction of moisture into the top region 134. The downward orientation will prevent the introduction of common environmental water exposures, such as through rain and melting snow, moving downward along the outer surface of the first upper tube 102. Alternatively, ventilation holes may be sealed after application of the anchor cap 100, through any physical medium, such as grease, epoxy cement, and rubber glue or adhesives or other compounds that may react with the anchor cap 100 material and form a permanent physical barrier. With this type of application, destruction of the cap may be required in order to remove it due to the above-described vacuum pressure issues.

Referring again to the present embodiment 100 illustrated in the figures, the first upper cylindrical tube 102 ends in a conical transitional shoulder structure 104, which is disposed generally radially outward from the main cylindrical tube 102 at an angle 180. The transitional shoulder 104 functions as a connective structure by transitioning into a second larger bottom tubular structure 120 configured to encompass the anchor nut 18 and washer 20. The second bottom tube 120 has a circular bottom edge 160 configured to firmly engage and form an air and water-tight seal with the wind tower foundation flange 14 top surface 52.

The sealing abilities of the invention are enhanced through forming a structural compression interface 162 between circular bottom edge 160 and the wind tower flange top surface 52. Accordingly, in one aspect of the present invention, circular bottom edge 160 is compelled with force against the wind tower base flange top surface 52. The downward force is responsive to a downward application of the anchor cap upper tube 102 onto the anchor bolt 16 until the circular bottom edge 160 is brought into engagement with the flange upper surface 52 with force, and then the anchor cap upper tube 102 is fixed into position on the anchor rod 16.

In one aspect of the present invention, the frictional interfaces 131 hold the downwardly-conveyed upper tube 102 firmly into position on the anchor bolt 16. For those embodiments of the present invention fabricated from flexible and resilient materials with good structural memory, such as rubberized plastic, bringing the bottom edge 160 against the flange upper surface 52 with force, results in material deformation of the anchor cap 100 body materials, and the resistance to this deformation by the anchor cap 100 body materials is translated into downward pressure by the circular bottom edge 160 against the wind tower flange upper surface 52. The firm engagement of the first upper tube 102 is thus translated through the conical transition shoulder 104 acting as a lever arm through the second bottom tube 120 to the circular bottom edge 160. The farther that the upper tube 102 is compelled downward onto the anchor bolt 16, the greater the engagement force applied at the interface 162 of the bottom edge 160 and flange upper surface 52.

The sealing properties of the resultant bottom edge interface 162 are enhanced when the circular bottom edge 160 is formed from a resilient and deformable material having good memory characteristics, thereby oriented to deform and create a physical barrier interface 162 with the top surface of the wind tower base flange 52 responsive to the above-described downward application force that prevents the introduction of water, air and other corrosion hazards into the interface area. As is readily apparent, where the bottom edge 160 is formed from a flexible and rubber-like material, it may responsively compress and deform to form a physical sealing interface structure. Alternatively, the second bottom structure 120 may be formed from rigid materials, and a gasket element (not shown) may be provided along the bottom edge 162 to form a sealing interface 62 responsive to compressive forces. This type of rigid element/gasket structure is well-known in the mechanical arts (one example is provided by the rubber gasket found at the base of rigid oil filters in automotive applications), and a detailed description is not believed to be necessary for one skilled in the art to practice the invention in this alternative fashion. Additionally, although the present embodiment shows a tubular or circular bottom structure 120 configured to encompass the anchor nut 18 and washer 20, alternative shapes may be practiced. Alternative shapes of the bottom structure 120 may include square, orthogonal or any variety of geometric shapes that may encompass the anchor nut 18 and washer 20. What is important is that the anchor cap bottom edge 160 may provide a sealing interface with the upper flange surface 52 to prevent the entry of moisture, water, oxygenating air or other gasses, or other corrosive elements into the anchor bolt 16/nut 18/flange 14 assembly, as well as regions therebelow, therefore also preventing their contact with and causing corrosion with the metallic surfaces associated therewith.

The sealing abilities of the circular bottom edge 160 responsive to the translation of forces arising through the downward compulsion of the anchor cap 100 are enhanced where the second larger bottom tube 120 is configured to encompass but not engage the anchor nut 18. This avoids diminishment of downward force translation effected by the conical transitional shoulder 104 through friction loss or frictional engagement resistance responsive to contact with nut 18 outer surfaces, and allows the conical transitional shoulder 104 to act as a lever arm in conveying these downward forces directly along the conical second bottom shoulder 120. Accordingly, in one aspect of the present invention, the second bottom tube 120 is configured to maintain an air gap 170 between the anchor nut 18 and the inner surface of the second bottom tube 122.

For example, for a No. 11 anchor nut 18 having an outer diagonal dimension defined by opposing intersecting corners of adjacent nut faces of about 2.6 inches and an outer diagonal dimension defined through the midpoints of opposing nut faces of about 2.25 inches, and having a body height of about 2.5 inches, the second bottom cylindrical tube 120 is defined about an inner diameter dimension 123 defined relative to the central axis C and having a value of about 2.718, and has a body length 125 at least a few hundred/thousandths of an inch greater than 2.5 inches.

In another aspect of the present invention, the bottom edge 160 may be configured to engage the anchor nut washer 20 by forming a sealing washer interface 180 along the washer outer side wall 22. Thus, in the embodiment 100 shown in the figures, for a common No. 11 anchor nut washer 20 having an outside diameter value of about 2.75 inches, where the second bottom structure 120 is a cylindrical tube defined about an inner diameter dimension 123 defined relative to the central axis C and having a value of about 2.718 inches, the portion of the bottom tube 120 conveyed about the washer 20 will stretch and deform outward slightly. And this outward stretching and deformation will result in reactive opposing forces compelled against the washer outer wall 22 by the deformed bottom inner surface interface 180, thus resulting in an air and waterproof seal along the washer outer wall 22 at the anchor cap bottom tube interface 180. Additionally, the application of lubricating or sealing compounds at the interface 180 will enhance and increase the air and waterproof qualities of the interface 180.

In a further aspect of the invention, for those embodiments wherein the second bottom tube 120 is configured to engage the anchor nut washer outer wall 22, this outer wall engagement helps to align the second bottom tube structure 120 about the anchor nut 18 and washer 20. This provides advantages where tolerances between the washer 20 and the anchor rod 16 may allow the center point of the washer 20 to be displaced significantly from coincidence with a center point defined by the central axis BC of the anchor rod 16. Where the anchor cap 100 structural connection of the first upper tube 102 through the conical shoulder 104 to the second bottom tube 120 is defined by flexible resilient materials, the anchor cap 100 structure may deform to enable lateral displacement of the second bottom tube 120 to align with the washer 20 and thereby maintain air and/or waterproof sealing characteristics at the washer sidewall interface 180 and/or flange upper surface interface 162.

In the present embodiment, the conical shoulder 104 is defined with respect to the first upper cylindrical tube 102 central axis C by an angle 180 selected to enhance the abilities of the anchor cap 100 to translate downward forces from the first upper tube 102 to the second bottom tube bottom edge 160. In one exemplary embodiment, the angle 180 has a value of about 30°, which has been found to have superior force transfer characteristics along an orientation parallel to the central axis C and thus parallel to the vertical orientation of the anchor rod bolt 16 and to its central axis BC, which is aligned generally coincident with the anchor cap central axis C when the anchor cap 100 is applied to the anchor rod 16. The present embodiment also provides enhanced force transfer characteristics by configuring the second bottom structure 120 in the form of a cylindrical tube defined about diameter 123 from the central axis C common to the first upper tube 102. Accordingly, the connective conical shoulder 104 transitions from the first upper tube 102 by rotating outward from the central axis C on a first radius 172, and then transitions to the second lower tube 120 by rotating inward toward the central axis C on an opposite second radius 174. One exemplary value of the radiuses 172 and 174 is a one-fourth radius or chamfer dimension.

In one exemplary embodiment of the present invention configured for application to a No. 11 rebar rod anchor bolt 16, the inner diameter 103 of a flexible, resilient and deformable anchor cap 100 formed from a white PVC material has a value of about 1.440 inches, with one ventilation hole 150 provided having a ⅛ inch diameter. The first upper cylindrical tube 102 has a body length value 110 selected for firm frictional and structural interaction with the anchor rod 16, sufficient to hold the anchor cap 100 in place after application. In the present example, for an anticipated anchor bolt total insertion length dimension 133 of about 10.75 inches, the first upper tube has a side-wall body length value 137 of about eight inches, and the overall anchor cap body length dimension 129 is about 12 inches. However, other dimensional values may be readily selected and the present invention is not to be construed as restricted to the examples provided herein.

The anchor cap 100 also has a wall thickness 105 selected to provide substantial physical integrity over the anticipated service life of the anchor cap 100 (for example, in excess of 20 years through exposure to harsh environmental conditions and livestock and perhaps human tampering) yet retain flexible deformation properties to enhance the translation of compressive forces downward into the circular bottom edge 160, thereby compelling the circular bottom edge 160 with force against the flange upper surface 52. One exemplary thickness body wall thickness 105 found to be satisfactory when white flexible PVC or black flexible PVC materials are used with the exemplary dimensions described herein is about 0.110 inches.

In another embodiment of the present invention configured for a No. 10 rebar anchor bolt 16 and a No. 10 anchor nut 18 having an outer diagonal dimension defined by opposing intersecting corners of adjacent nut faces of about 2.309 inches and an outer diagonal dimension defined through the midpoints of opposing nut faces of about 2.0 inches, the nut 18 has a body height of about 2.25 inches, the second bottom cylindrical tube inner diameter dimension 123 has a value of about 2.688 inches, and the second tube body length 125 is at least a few hundred/thousandths of an inch greater than 2.25 inches, such as, for example, about 2.375 inches. The overall anchor cap body length dimension 129 is about 13 inches, the upper tube body length dimension 137 is about 9.328 inches, the upper tube inner surface diameter 103 is about 1.315 inches, and the ventilation hole 150 is located a placement distance dimension 139 of about 12.5 inches.

An exemplary embodiment of the present invention configured for a No. 11×3 anchor rod 16 with a 13" OAL has a second bottom cylindrical tube inner diameter dimension 123 value of about 2.688 inches, the second tube body length 125 of about 2.6875 inches, an overall anchor cap body length dimension 129 of about 13 inches, the upper tube body length dimension 137 is about 9.123 inches, the upper tube inner surface diameter 103 is about 1.44 inches, and the ventilation hole 150 is located a placement distance dimension 139 of about 12.0 inches.

An exemplary embodiment of the present invention made from black flexible PVC is configured for an M32×4 anchor rod 16 with a 13" OAL and has a second bottom cylindrical tube inner diameter dimension 123 value of about 2.688 inches, the second tube body length 125 is about 2.6875 inches, the overall anchor cap body length dimension 129 is about 13 inches, the upper tube body length dimension 137 is about 9.046 inches, the upper tube inner surface diameter 103 is about 1.351 inches, and the ventilation hole 150 is located a placement distance dimension 139 of about 12.5 inches.

Another exemplary embodiment of the present invention made from black flexible PVC is configured for an M36×4 anchor rod 16 with a 13" OAL and has a second bottom cylindrical tube inner diameter dimension 123 value of about 2.938 inches, the second tube body length 125 is about 2.9375 inches, the overall anchor cap body length dimension 129 is about 13 inches, the upper tube body length dimension 137 is about 8.734 inches, the upper tube inner surface diameter 103 is about 1.529 inches, and the ventilation hole 150 is located a placement distance dimension 139 of about 12.5 inches.

As shown above, a variety of specific dimension values will be found appropriate, and the present invention is not limited to the exemplary dimension provided herein.

It is also to be understood that other embodiments of the invention may provide for rigid body structures that do not distort but yet provide comparable reactive sealing forces against the wind tower flange top surface 52. It will be readily apparent to one skilled in the art that the sealing capabilities of rigid materials may be provided and/or enhanced by the application of additional sealing compounds or membranes or materials at the interface of the circular bottom edge 160 with the wind tower flange top surface 52 and/or at the first upper tube interfaces 131. Accordingly, the present invention is not restricted to soft, resilient, and readily distortable embodiments described thus far. What is important is the ability of the anchor cap structure to form one or more sealing interfaces at the wind tower flange top surface interface 162, and/or the washer outer wall interface 180, and/or the anchor rod outer thread surface interface 131, and to be held firmly in place.

Moreover, retention of an anchor cap according to the present invention may be achieved by means other than frictional engagement with the anchor rod 16 by first upper tube interfaces 131. For example, an adhesive means may be applied to one or more of the bolt thread interfaces 131, flange surface interface 162 and washer outer wall interface 180 sufficient to hold the invention in place without frictional engagement of the anchor rod threads outer surface 132. Or some other type of mechanical means may be employed to keep an anchor cap according to the present invention in place over an anchor rod 16/anchor nut 18/tower flange 14 assembly. One illustrative example would be a mechanical clamping means (not shown) applied to at least one location about the first upper tube and utilized to clamp the first upper tube 102 to the anchor rod 16. One example of the mechanical clamping means is at least one mechanical band clamp. Another example is a resilient and deformable "O-ring" having a contracted interior diameter smaller than the anchor bolt rod 16 thread outer diameter BTD, which may be stretched about the upper tube 102 and an encompassed anchor bolt rod 16, and thus responsively constrict about the assembly. Other mechanical attachment means will be readily apparent to one skilled in the art and the present invention is not to be construed as being limited to the examples described above.

Thus, while preferred embodiments of the invention have been described herein, variations in the design may be made, and such variations may be apparent to those skilled in the art of making structural assembly sealing elements, as well as to those skilled in other arts. The materials identified above are by no means the only materials suitable for the manufacture of the tool, and substitute materials will be readily apparent to one skilled in the art. The scope of the invention, therefore, is only to be limited by the following claim(s).

What is claimed is:

1. An anchor rod cap, comprising:
   a rubber-like, deformable, flexible and resilient upper tube having an inner cylindrical surface defined on an upper tube interior surface diameter from a cap central axis and a wall thickness defined from the inner cylindrical surface, where in use the upper tube inner cylindrical surface is adapted to conform to and tightly engage and form an airtight sealing frictional interfaces friction-fit with an outer thread surface of an anchor rod bolt defined on an outer thread diameter from a rod bolt central axis, the bolt outer thread surface diameter corresponding to and greater than the upper tube interior surface diameter, the upper tube inner cylindrical surface adapted to remain spaced from an inner thread surface of the anchor rod bolt within the outer thread diameter and more proximate to the bolt central axis than the outer thread surface;
   a ventilation hole defined through the upper tube resilient wall and located near a top of the upper tube, the ventilation hole adapted to admit or expel ambient air from the upper tube and thereby reduce air pressure resistance or vacuum resistance to a sliding application or a sliding removal of the resilient upper tube inner cylindrical surface from the airtight sealing friction-fit about the anchor rod bolt outer thread surfaces;
   the resilient wall upper cylindrical tube ending in a resilient wall conical transitional shoulder disposed radially outward from the main cylindrical tube relative to the cap central axis and at an angle with the cap central axis;
   the resilient wall conical transitional shoulder transitioning into a resilient wall bottom tube having an inner cylindrical surface defined by a bottom tube interior surface diameter from the cap central axis and larger than the upper tube interior surface diameter, the bottom tube inner cylindrical surface adapted to encompass but not engage an anchor nut threaded onto the anchor rod bolt by defining an air gap between the bottom tube inner cylindrical surface and the anchor nut; and
   a resilient wall bottom tube edge located at a bottom of the resilient wall bottom tube;
   where in use the resilient wall bottom tube and the resilient wall bottom tube edge are disposed circumferentially encompassing but not engaging the anchor nut, and the friction-fit of the upper tube inner cylindrical surface about the threaded anchor rod bolt outer thread surface is adapted to hold the anchor rod cap in place relative to the threaded anchor rod bolt without any other vacuum, threaded anchor rod bolt or anchor nut engagement means.

2. The anchor rod cap of claim 1 wherein the upper tube resilient wall is a flexible PVC and the wall thickness is about 0.110 inches.

3. The anchor rod cap of claim 2 wherein the shoulder angle is about 30 degrees.

4. The anchor rod cap of claim 3 wherein the ventilation hole has an opening diameter of about ⅛ inch.

5. The anchor rod cap of claim 3 further adapted to circumferentially encompass but not engage the anchor nut when the upper tube is friction-fit about the anchor rod bolt outer thread surface at a total insertion length dimension of the anchor bolt rod relative to the bottom tube edge of about 10.75 inches, the ventilation hole located a placement distance dimension from the bottom tube edge of about 11.5 inches.

6. The anchor rod cap of claim 4 wherein the resilient wall bottom tube inner cylindrical surface is further adapted to engage an anchor washer disposed between the anchor nut and a lower base flange by forming a sealing washer interface along a washer outer side wall.

7. The anchor rod cap of claim 4 wherein the resilient wall bottom tube edge is further adapted to form a physical barrier interface with a lower base flange disposed below the anchor nut when compelled against the lower base flange by the upper tube positioned in the friction-fit about the threaded anchor rod bolt outer thread surface.

8. An assembly, comprising:
  a threaded anchor rod bolt having an outer thread surface located on an outer thread diameter relative to a central bolt axis and an inner thread surface within the outer thread diameter and more proximate to the bolt central axis than the outer thread surface;
  a threaded anchor nut tightened about the threaded anchor rod bolt into a forceful engagement with an anchor flange assembly; and
  an anchor rod cap upper tube having a rubber-like, deformable, flexible and resilient inner cylindrical surface defined on a upper tube interior surface diameter from a cap central axis and a wall thickness defined from the inner cylindrical surface, the rod bolt outer thread diameter corresponding to and greater than the upper tube interior surface diameter, the upper tube inner cylindrical surface conforming to and tightly engaging and forming an airtight sealing frictional interface friction-fit with the threaded anchor rod bolt outer thread surface and spaced from the threaded anchor rod bolt inner thread surface;
  a ventilation hole defined through the anchor rod cap upper tube resilient wall and located near a top of the upper tube and above a top end of the threaded anchor rod bolt, the ventilation hole adapted to admit or expel ambient air from an interior region of the upper tube above the threaded anchor rod bolt top end and the anchor rod bolt outer thread surface airtight sealing frictional interface friction-fit and thereby reduce air pressure resistance or vacuum resistance to a sliding application or a sliding removal of the resilient upper tube from the sealing frictional interface friction-fit about the threaded anchor rod bolt outer thread surface;
  the anchor rod cap upper tube ending in a anchor rod cap resilient wall conical transitional shoulder disposed radially outward from and at an angle with the rod cap central axis; and
  the anchor rod cap conical transitional shoulder transitioning into an anchor rod cap resilient wall bottom tube having an inner cylindrical surface and a bottom tube edge both defined on a bottom tube interior surface diameter from the rod cap central axis, the bottom tube interior surface diameter larger than the upper tube interior surface diameter and an outer diagonal dimension of the anchor nut defined by opposing intersecting corners of adjacent nut faces of the anchor nut, the bottom tube inner cylindrical surface and bottom edge encompassing but not engaging the anchor nut threaded onto the threaded anchor rod bolt and defining an air gap between the bottom tube inner cylindrical surface and the anchor nut;
  wherein the bottom tube inner cylindrical surface and bottom edge encompass but do not engage the anchor nut, and the airtight sealing frictional interface friction-fit of the upper tube inner cylindrical surface about the threaded anchor rod bolt outer thread surface holds the anchor rod cap in place relative to the threaded anchor rod bolt without any other vacuum, threaded anchor rod or nut engagement means.

9. The assembly of claim 8 wherein the upper tube resilient wall is a flexible PVC and the wall thickness is about 0.110 inches.

10. The assembly of claim 9 wherein the shoulder angle is about 30 degrees.

11. The assembly of claim 9 wherein the ventilation hole has an opening diameter of about 1/8 inch.

12. The assembly of claim 10 wherein the threaded anchor rod bolt is inserted into the anchor rod cap at a total insertion length dimension relative to the bottom tube bottom edge of about 10.75 inches, and the ventilation hole is located a placement distance dimension from the bottom tube bottom edge of about 11.5 inches.

13. The assembly rod cap of claim 12 wherein the bottom tube inner cylindrical surface further forms a sealing washer interface along a washer outer side wall of an anchor washer disposed below the anchor nut in the flange assembly.

14. The assembly of claim 12 wherein the bottom tube edge is compelled against the lower base flange by the upper tube positioned in the friction-fit about the anchor rod bolt and forms a physical barrier interface with a lower base flange disposed below the anchor nut in the flange assembly.

15. A method for protecting an anchor rod assembly with an anchor rod cap, comprising:
  providing an anchor rod cap comprising a rubber-like, deformable, flexible and resilient upper tube having an inner cylindrical surface defined on a first interior surface diameter from a cap central axis and a wall thickness defined from the inner cylindrical surface, a ventilation hole defined through the upper tube resilient wall and located near a top of the upper tube, the upper tube ending in a resilient wall conical transitional shoulder disposed radially outward from and at an angle with the rod cap central axis, and the resilient wall conical transitional shoulder transitioning into a resilient wall bottom tube having an inner cylindrical surface and a bottom tube edge both defined on a bottom tube interior surface diameter from the rod cap central axis larger than the upper tube interior surface diameter; and
  disposing the anchor rod cap about an anchor rod assembly comprising a threaded anchor rod bolt having an outer thread surface located on an outer thread diameter relative to a central axis of the threaded anchor rod bolt and an inner thread surface within the outer thread diameter and more proximate to the bolt central axis than the outer thread surface, the threaded anchor rod bolt outer thread diameter corresponding to and greater than the upper tube interior surface diameter, and an anchor nut tightened about the anchor rod bolt into a forceful engagement with an anchor flange assembly at a bottom end of the threaded anchor rod bolt, an outer diagonal dimension of the anchor nut defined by opposing intersecting corners of adjacent nut faces of the anchor nut smaller than the resilient wall bottom tube inner cylindrical surface surface diameter;
  wherein disposing the anchor rod cap about the anchor rod assembly comprises:
  sliding the upper tube inner cylindrical surface onto the threaded anchor rod bolt outer thread surface, the upper tube inner cylindrical surface conforming to and tightly engaging and forming an airtight sealing frictional interface in a friction-fit with the threaded anchor rod bolt outer thread surface and remaining spaced from the inner thread surface;
  the ventilation hole expelling ambient air enclosed within a top region of the upper tube defined by the upper tube inner cylindrical surface, the sealing frictional interface friction-fit with the threaded anchor rod bolt outer thread surface and a top end of the anchor rod bolt and thereby reducing air pressure resistance to the sliding upon the threaded anchor rod bolt outer thread surface from the expelled ambient air;

the bottom tube inner cylindrical surface encompassing but not engaging the anchor nut threaded onto the threaded anchor rod bolt and defining an air gap between the bottom tube inner cylindrical surface and the anchor nut; and the airtight sealing frictional interface friction-fit of the upper tube inner cylindrical surface about the threaded anchor rod bolt outer thread surface holding the anchor rod cap in place relative to the threaded anchor rod bolt requiring a sealing of the ventilation hole or any other vacuum, threaded anchor rod or nut engagement means.

16. The method of claim 15 wherein:

the upper tube resilient wall is a flexible PVC and the wall thickness is about 0.110 inches;

the shoulder angle is about 30 degrees; and the ventilation hole has an opening diameter of about 1/8 inch.

17. The method of claim 16, wherein the ventilation hole is defined a placement distance from the bottom tube bottom edge of about 11.5 inches; and wherein the sliding the upper tube inner cylindrical surface onto the threaded anchor rod bolt outer thread surface comprises inserting the threaded anchor rod bolt into the anchor rod cap a total insertion length relative to the bottom tube bottom edge of about 10.75 inches.

18. The method of claim 17, further comprising:

the bottom tube inner cylindrical surface forming a sealing washer interface along a washer outer side wall of an anchor washer disposed below the anchor nut in the flange assembly.

19. The method of claim 17, further comprising:

the friction-fit of the upper tube positioned about the threaded anchor rod bolt compelling the bottom tube edge against a lower base flange disposed below the anchor nut in the flange assembly; and the compelled bottom tube edge forming a physical barrier interface with the lower base flange.

* * * * *